Patented Mar. 10, 1942

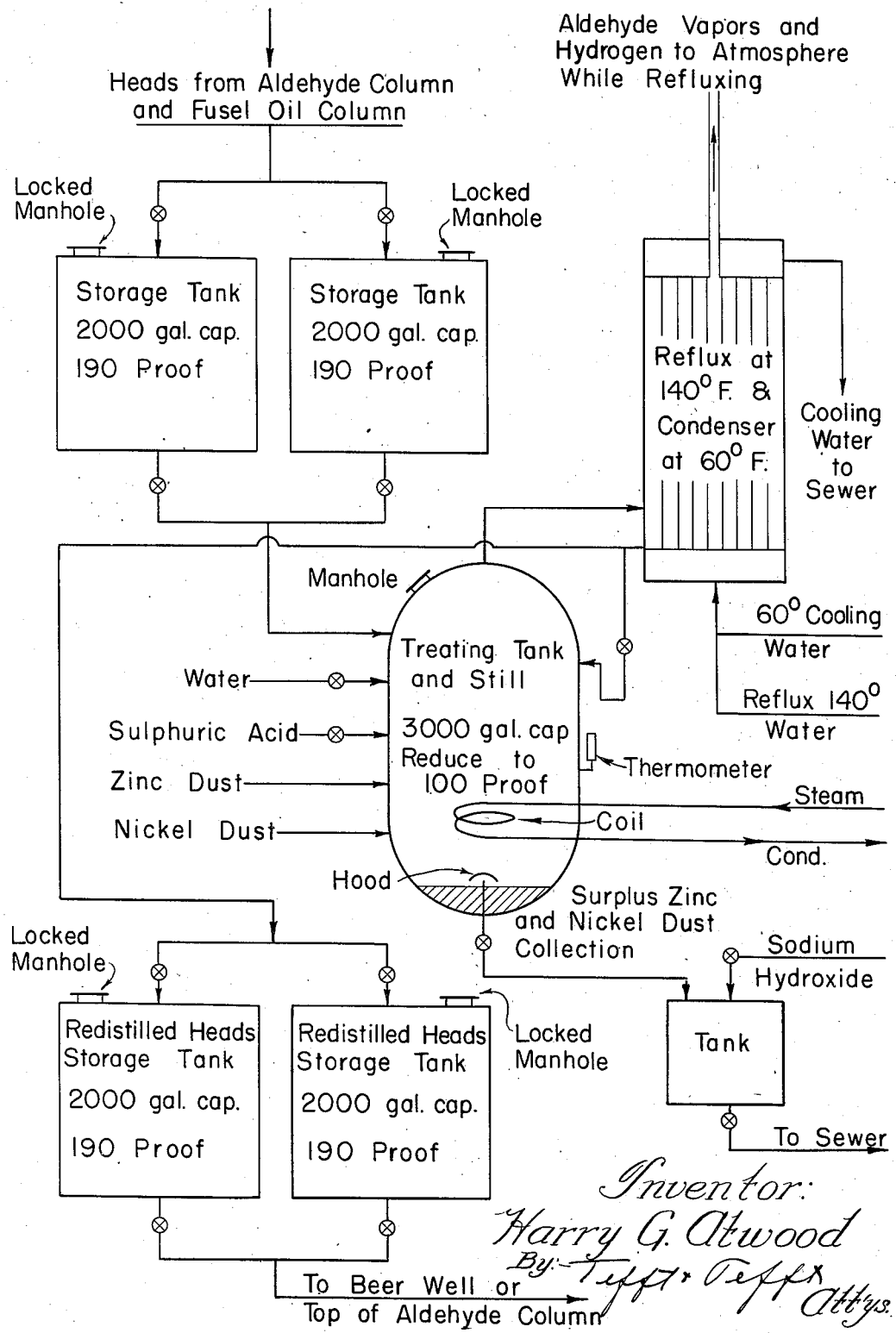

2,276,142

UNITED STATES PATENT OFFICE 2,276,142

PROCESS FOR PURIFYING AND DEODORIZING ALCOHOLIC LIQUIDS

Harry G. Atwood, Peoria, Ill.

Application November 29, 1940, Serial No. 367,685

2 Claims. (Cl. 260—643)

This invention relates to the art of rectifying or purifying alcohol containing aldehydes and refers particularly to beverage alcohols in which smell and taste are the important factors.

It is well understood in the art that heads from the aldehyde and fusel oil columns of distilleries produce ethyl alcohol having foul smelling and other undesirable characteristics which greatly depreciate its value. To separate the aldehyde impurities by fractional distillation yields little or no profit because this material has relatively little commercial value. A profitable conversion method to convert this product into a desirable alcohol commanding a higher market price has been sought for by distillers for many years. The methods thus developed have had indifferent success or have been defeated by their cost.

It is the particular object of this invention to provide a conversion or rectifying process whereby a commercially valuable alcohol can be produced rapidly and economically from low value alcohols from the aldehyde and fusel oil columns of distilleries.

Reference will be had to the accompanying process chart which will clearly reveal the process which I will now describe.

I mix with the distillate containing aldehydes a relatively small amount of acid and powdered metal, then heat and reflux the mixture at variable temperatures depending upon the amount and character of the aldehydes while permitting a portion of aldehyde and hydrogen vapors to escape to atmosphere carrying away the objectionable materials. After this treatment the remaining purified alcohol is distilled and reclaimed as deodorized, commercially valuable alcohol.

*Example No. 1.*—To 1,000 parts of alcohol containing aldehydes at approximately 100 proof, 5 gallons of sulphuric acid are added. To this mixture 42 pounds of zinc dust and 8 pounds of nickel powder are added. The whole is heated to a refluxing temperature and allowed to reflux for one hour or longer. The water in the reflux condenser is maintained at a temperature of 60 to 70° F. The purified alcoholic liquid is then distilled and the first 10% by volume, distilled is reserved separately for the next charge, the remainder being purified deodorized alcoholic liquid.

*Example No. 2.*—To 1,000 parts of alcohol containing aldehydes at approximately 100 proof, 5 gallons of sulphuric acid are added. To this mixture 42 pounds of zinc dust and 8 pounds of nickel powder are added. The whole is heated to a refluxing temperature and allowed to reflux for one hour or longer. The water in the reflux condenser is maintained at a temperature of 130 to 140° F. The whole is allowed to reflux until 10% of the original volume has been vented out the top of the reflux condenser. The purified alcoholic liquid is then distilled completely. The distillate being purified deodorized alcoholic liquid.

In each of the above examples a definite improvement in odor is noted and while the specific examples herein disclose the use of reflux and distillation it is to be understood that the above are but illustrative of my process which is not limited by the specific terms of the disclosures, but includes other methods of heating in any or all type containers and may be followed by amplified distillation to accomplish the object within scope of this invention.

Having thus described my invention, I claim:

1. The process of reclaiming commercially valuable alcohols from alcohol containing aldehydes which consists of mixing sulphuric acid, zinc dust and nickel powder with said aldehydes, heating and refluxing the mixture while volatalizing a portion to carry off undesirable elements, and then distilling the balance of the mixture to obtain deodorized, commercially valuable alcohol.

2. The process of reclaiming commercially valuable alcohols from alcohol containing aldehydes which consists of mixing sulphuric acid, zinc dust and nickel powder with said aldehydes, heating and refluxing the mixture, distilling the mixture by removing the first portion of the distillate with substantially all of the undesirable elements and then reclaiming the balance of the distillate as deodorized, commercially valuable alcohol.

HARRY G. ATWOOD.